US011493309B2

(12) United States Patent
Van Elburg et al.

(10) Patent No.: US 11,493,309 B2
(45) Date of Patent: Nov. 8, 2022

(54) BALLISTIC-RESISTANT MOLDED ARTICLE

(71) Applicant: DSM Protective Materials B.V., Geleen (NL)

(72) Inventors: Johann Van Elburg, Echt (NL); Matthew Craig, Stanley, NC (US); James Rogers, Stanley, NC (US)

(73) Assignee: DSM PROTECTIVE MATERIALS B.V., Geleen (NL)

( * ) Notice: Subject to any disclaimer, the term of this patent is extended or adjusted under 35 U.S.C. 154(b) by 0 days.

(21) Appl. No.: 16/954,682

(22) PCT Filed: Dec. 12, 2018

(86) PCT No.: PCT/EP2018/084494
§ 371 (c)(1),
(2) Date: Jun. 17, 2020

(87) PCT Pub. No.: WO2019/121209
PCT Pub. Date: Jun. 27, 2019

(65) Prior Publication Data
US 2021/0088312 A1 Mar. 25, 2021

Related U.S. Application Data

(60) Provisional application No. 62/599,924, filed on Dec. 18, 2017.

(51) Int. Cl.
| | | |
|---|---|---|
| *F41H 5/04* | (2006.01) | |
| *B32B 5/26* | (2006.01) | |
| *B32B 37/12* | (2006.01) | |
| *B32B 5/12* | (2006.01) | |
| *B32B 37/06* | (2006.01) | |
| *B32B 37/08* | (2006.01) | |
| *B32B 37/10* | (2006.01) | |

(52) U.S. Cl.
CPC ............ *F41H 5/0485* (2013.01); *B32B 5/26* (2013.01); *B32B 37/12* (2013.01); *B32B 5/12* (2013.01); *B32B 37/06* (2013.01); *B32B 37/08* (2013.01); *B32B 37/10* (2013.01); *B32B 2260/023* (2013.01); *B32B 2260/046* (2013.01); *B32B 2262/0253* (2013.01); *B32B 2305/18* (2013.01); *B32B 2307/718* (2013.01); *B32B 2323/04* (2013.01); *B32B 2571/02* (2013.01)

(58) Field of Classification Search
CPC ........ F41H 5/0485; B32B 37/12; B32B 37/08
See application file for complete search history.

(56) References Cited

U.S. PATENT DOCUMENTS

| | | | |
|---|---|---|---|
| 2005/0197020 A1* | 9/2005 | Park | F41H 5/0471 442/41 |
| 2009/0280708 A1* | 11/2009 | Marissen | F41H 5/04 156/308.2 |
| 2012/0183716 A1 | 7/2012 | Jordan et al. | |

FOREIGN PATENT DOCUMENTS

| | | |
|---|---|---|
| CN | 101479557 | 7/2009 |
| EP | 3 193 132 | 7/2017 |
| WO | 2007/122011 | 11/2007 |

OTHER PUBLICATIONS

International Search Report for PCT/EP2018/084494 dated Mar. 27, 2019, 5 pages.
Written Opinion of the ISA for PCT/EP2018/084494 dated Mar. 27, 2019, 7 pages.

\* cited by examiner

*Primary Examiner* — Carson Gross
(74) *Attorney, Agent, or Firm* — Nixon & Vanderhye P.C.

(57) ABSTRACT

The present invention provides process for producing a ballistic-resistant molded article, which molded article comprises: i) a plurality of layers of unidirectionally aligned polyolefin fibers, which layers are substantially absent a bonding matrix; and ii) a plurality of layers of adhesive, and which process comprises: a) providing a plurality of precursor sheets, each of said precursor sheets comprising i) at least one layer of unidirectionally aligned polyolefin fibers which layer is substantially absent a bonding matrix, and ii) at least one layer of adhesive; b) stacking said precursor sheets to form a stack, wherein the total amount of adhesive in the stack is from 5.0 to 12.0 wt. % based on the total weight of the stack; c) pressing the stack produced in step b) at a temperature of from 1 to 30° C. below the melting point of the polyolefin fibers and at a pressure of at least 8 MPa; and d) cooling the pressed stack produced in step c) to at least 50° C. below the melting point of the polyolefin fibers while maintaining pressure.

9 Claims, No Drawings

BALLISTIC-RESISTANT MOLDED ARTICLE

This application is the U.S. national phase of International Application No. PCT/EP2018/084494 filed Dec. 12, 2018 which designated the U.S. and claims priority to U.S. Provisional Patent Application No. 62/599,924 filed Dec. 18, 2017, the entire contents of each of which are hereby incorporated by reference.

The invention relates to a process for producing a ballistic-resistant molded article comprising a plurality of layers of unidirectionally aligned polyolefin fibers substantially absent a bonding matrix and a plurality of layers of adhesive. The invention further relates to a ballistic-resistant molded article obtainable by said process and a precursor sheet suitable for use in said process.

Ballistic-resistant molded articles produced by pressing a stack of layers of unidirectionally aligned fibers embedded in a matrix are known in the art. It is also taught in the art to minimise the proportion of bonding matrix present in order to improve ballistic-resistant performance at a given areal density. The rationale proposed for this is that, while some matrix is required in order to provide mechanical integrity to the molded article, bonding matrix does not contribute to the projectile stopping capability; accordingly, it's presence should be minimized or even avoided.

WO2009/056286 describes a material sheet of unidirectionally aligned polyethylene fibers having no matrix present, rather fibers are fused together by the application of heat and pressure to fibers wound around a plate. Perpendicular layers are wound sequentially around a plate; the plate with wound fiber layers is compressed; then the resulting two sheets of consolidated layers are removed from the plate.

WO2010/1222099 describes embodiments of layers of woven fibers which are consolidated into a stiff panel in the absence of a bonding matrix. Production of tapes, by subjecting unidirectionally aligned fibers to heat and pressure, without a bonding matrix being present, is further described in WO2012/080274. Said tapes are used to produce a consolidated stack of monolayers, without addition of a bonding matrix.

WO2013/131996 describes a composite panel made from tapes of a thermoplastic polymer, for example produced from fibers of ultrahigh molecular weight polyethylene, and a plastomer as adhesive. Ballistic-resistant molded articles are produced by pressing sheets formed from the tapes.

It is further known in the art that, as the density of a pressed stack of layers is increased, its ballistic performance (specific energy of absorption) increases. WO1997/00766 describes pressing a stack of layers of ultrahigh molecular weight polyethylene impregnated with a bonding matrix to achieve a density of the compressed stack of as high as 99.5% of theoretical maximum density. As pressing pressure is increased however, the density of the stack is increased at a diminishing rate. Accordingly, an upper limit of beneficial pressing pressure is suggested.

Materials described in the prior art may have satisfactory ballistic-resistant performance; however, this performance could be improved.

An object of the present invention is therefore to provide a ballistic-resistant molded article having improved ballistic-resistant performance at a given areal density. A further object is an improved process for producing a ballistic-resistant molded article with improved ballistic performance.

The present inventors have found that by pressing a plurality of layers of unidirectionally aligned polyolefin fibers which layers are substantially absent a bonding matrix; and a plurality of layers of adhesive, wherein the total amount of adhesive is from 5.0 to 12.0 wt. % based on the total weight of the molded article under specified pressure and temperature conditions, yields a molded article with improved ballistic performance.

Accordingly, the present invention provides a process for producing a ballistic-resistant molded article, which molded article comprises:
i) a plurality of layers of unidirectionally aligned polyolefin fibers, which layers are substantially absent a bonding matrix; and
ii) a plurality of layers of adhesive, and which process comprises:
a) providing a plurality of precursor sheets, each of said precursor sheets comprising i) at least one layer of unidirectionally aligned polyolefin fibers which layer is substantially absent a bonding matrix, and ii) at least one layer of adhesive;
b) stacking said precursor sheets to form a stack;
c) pressing the stack produced in step b) at a temperature of from 1 to 30° C. below the melting point of the polyolefin fibers and at a pressure of at least 8 MPa; and
d) cooling the pressed stack produced in step c) to at least 50° C. below the melting point of the polyolefin fibers while maintaining pressure.

Further the present invention provides a ballistic-resistant molded article obtainable by the above process.

Still further, the present invention provides a ballistic-resistant molded article, which comprises:
i) a plurality of layers of unidirectionally aligned polyolefin fibers, which layers are substantially absent a bonding matrix; and
ii) a plurality of layers of adhesive, wherein the total amount of adhesive present is from 5.0 to 12.0 wt. % based on the total weight of the ballistic-resistant molded article.

The present invention further provides a precursor sheet comprising at least two layers of unidirectionally aligned polyolefin fibers which layers are substantially absent a bonding matrix, and at least two layers of adhesive, wherein each of the layers of unidirectionally aligned polyolefin fibers are separated by one layer of adhesive, characterized in that the adhesive is present in an amount of from 5.0 to 12.0 wt. % based on the total weight of the precursor sheet.

As used herein the term "a plurality" means an integer greater than 1.

As used herein the term "unidirectionally aligned" means fibers in a layer are orientated substantially parallel to one another, in the plane defined by the layer.

As used herein the term "substantially absent a bonding matrix" means that a layer of fibers may include a trace amount of a bonding matrix provided that the trace is materially insignificant. Substantially absent a bonding matrix typically means that the layer comprises at most 1.0 wt. % bonding matrix. In other words, the layer is essentially free of a bonding matrix. Preferably, substantially absent means absent.

As used herein the term "absent a bonding matrix" means containing 0.0 wt. % bonding matrix based on the weight of the layer. Accordingly, the layers comprising unidirectionally aligned polyolefin fibers are preferably free from a bonding matrix; in other words, a bonding matrix is completely absent. A layer of adhesive is distinct from a layer of unidirectionally aligned drawn polyolefin fibers. The layers comprising unidirectionally aligned polyolefin fibers may comprise mechanically fused unidirectionally aligned polyolefin fibers.

As used herein, the term "bonding matrix" refers to substances other than the fiber itself, which act to bond fibers together.

As used herein the term "precursor sheet" refers to an intermediate multilayered material sheet suitable for forming the ballistic-resistant molded article.

As used herein "melting point" refers to the temperature at which the main peak of a differential scanning calorimetry (DSC) second heating curve (carried out at a heating rate of 10° C./min) of the fibers occurs.

Within the context of the present application, a fiber is an elongated body with length dimension much greater than its width and thickness. The term fiber thus includes a monofilament, a multifilament yarn, a ribbon, a strip or tape and the like. A layer comprising strips or tapes may abut or overlap. A fiber can have any cross-sectional shape. The cross section may vary along the length of the fiber. Typically, a fiber is a monofilament. Typically, the fiber has a cross sectional aspect ratio, defined by the ratio of the largest dimension between two points on the perimeter of a cross-section of the fiber and the lowest dimension between two points on the same perimeter of less than 5:1, preferably of at most 3:1; more preferably less than 2:1.

Good results may be obtained when the polyolefin fibers are polyethylene fibers. Suitable polyolefins are in particular homopolymers and copolymers of ethylene and propylene, which may also contain small quantities of one or more other polymers, in particular other alkene-1-polymers. Preferred polyethylene fibers are high and ultrahigh molecular weight polyethylene ([U]HMWPE) fibers.

Polyethylene fibers may be manufactured by any technique known in the art, preferably by a melt or a gel spinning process. Most preferred fibers are gel spun UHMWPE fibers, e.g. those sold by DSM Dyneema, Heerlen, Netherlands, under the name Dyneema®. If a melt spinning process is used, the polyethylene starting material used for manufacturing thereof preferably has a weight-average molecular weight between 20,000 and 600,000 g/mol, more preferably between 60,000 and 200,000 g/mol. An example of a melt spinning process is disclosed in EP 1,350,868 incorporated herein by reference. If the gel spinning process is used to manufacture said fibers, preferably an UHMWPE is used with an intrinsic viscosity (IV, as determined according to ASTM 1601 and preferably as described with respect to the examples, on solutions in decalin at 135° C.) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fiber Spinning Technology*", Ed. T. Nakajima, Woodhead Publ. Ltd (1994), ISBN 185573 182 7.

Fibers from these polyolefins are preferably highly oriented by drawing at a suitable temperature, to obtain a drawn polyolefin fiber. Drawing is typically carried out elevated temperature, below the melting point of the fiber. The polyolefin fiber is preferably a drawn polyolefin fiber.

The tensile strength of the polyolefin fibers is preferably at least 1.2 GPa, more preferably at least 2.5 GPa, most preferably at least 3.5 GPa. The tensile modulus of the polyolefin fibers is preferably at least 5 GPa, more preferably at least 15 GPa, most preferably at least 25 GPa. Best results were obtained when the polyolefin fibers were UHMWPE fibers having a tensile strength of at least 2 GPa, more preferably at least 3 GPa and a tensile modulus of preferably at least 50 GPa, more preferably of at least 90 GPa, most preferably at least 120 GPa.

A layer of unidirectionally aligned polyolefin fibers which layer is substantially absent a bonding matrix is typically formed from fusing of fibers. Fusing is preferably achieved under a combination of pressure, temperature and time which results in substantially no melt bonding. Preferably, there is no detectable melt bonding as detected by DSC (10° C./min). No detectable melt bonding means that no visible endothermic effect consistent with partially melt recrystallized fibers is detected, when the sample is analyzed in triplicate. Preferably, fusing is mechanical fusing. Mechanical fusing is thought to occur by deformation of fibers leading to increased mechanical interlocking of parallel fibers and increased van der Waals interaction between fibers. Accordingly, the fibers within a layer are typically fused. Therefore, the layer may have good structural stability without any bonding matrix or adhesive being present. Further, it may have good structural stability without any melting of fibers.

A layer of unidirectionally oriented polyolefin fibers substantially absent a bonding matrix may be formed by subjecting a parallel array of filaments to elevated temperature and pressure. The means for applying pressure may be a calender, a smoothing unit, a double belt press or an alternating press. A preferred manner of applying pressure is by introducing an array of unidirectionally oriented fibers to the nip of calender, substantially as described in WO 2012/080274 A1.

Preferably, the thickness of the layer comprising unidirectionally aligned polyolefin fibers is at least 1.0, more preferably at least 1.3, most preferably at least 1.5 times the thickness of an individual polyolefin fiber. If polyolefin fibers with different thicknesses are used, by the thickness of an individual fiber is herein understood an average thickness of the utilized fibers. Preferably, the maximum thickness of said layer is no more than 20, more preferably no more than 10, even more preferably no more than 5 and most preferably no more than 3 times the thickness of an individual polyolefin fiber.

The mechanical properties of the layers of unidirectionally aligned polyolefin fibers of the invention are typically similar to the mechanical properties of the fibers utilized to manufacture thereof. The tensile strength of a layer of unidirectionally aligned polyolefin fibers is preferably at least 1 GPa, more preferably at least 2 GPa, most preferably at least 3 GPa. The tensile modulus of the layer of unidirectionally aligned polyolefin fibers is preferably at least 40 GPa, more preferably at least 80 GPa, more preferably at least 100 GP.

Typically, a layer of unidirectionally aligned polyolefin fibers has a thickness of from 10 to 200 μm. Preferably, the thickness is from 25 to 120 μm; more preferably the thickness is from 35 to 100 μm. Thickness of a layer may be measured by taking an average of three measurements, for example using microscopy.

A stack is formed from a number of precursor sheets. The stack may comprise only identical precursor sheets, or a mixture of different precursor sheets. The stack is typically pressed in a conventional press for producing ballistic-resistant molded articles. Preferably, the pressure of step c) is at least 10 MPa. More preferably, the pressure of step c) is at least 12 MPa; more preferably at least 15 MPa. Whilst the theoretical upper pressure limit may be higher, in practice the pressure of step c) is at most 30 MPa. In step c) the temperature is preferably at least 3° C. below the melting point of the polyolefin; more preferably it is at least 5° C. below the melting point of the polyolefin fiber; most preferably at least 10° C. below the melting point of the polyolefin fiber. The melting point of the polyolefin fiber is determined by DSC as described herein.

Preferably, the total amount of adhesive present is from 6.0 to 11.0 wt. % based on the total weight of the stack. More preferably, the total amount of adhesive present is from 7.0 to 10.5 wt. %; more preferably from 7.5 to 10.0 wt. %; most preferably from 8.0 to 9.5 wt. % based on the total weight of the stack.

In step d) the pressed stack is cooled under pressure. Maintaining pressure until the pressed stack is cooled, ensures that the layers of unidirectionally aligned polyolefin fibers adhere well. In particular, it prevents relaxation of the layer as the pressure is reduced. Preferably cooling under pressure is carried out to below 80° C. Preferably, the pressure applied in step c) is maintained in step d). Alternatively a lower pressure may be applied.

The term adhesive refers to a material that adheres adjacent layers of unidirectionally aligned fibers together. The adhesive provides structural rigidity to the precursor sheet of the present invention. It also acts to improve inter-layer bonding between adjacent layers of unidirectionally aligned fibers in the molded article of the present invention. In the molded article of the present invention, the adhesive forms a layer between adjacent layers of unidirectionally aligned fibers. The adhesive may completely cover a surface of an adjacent layer of unidirectionally aligned fibers or it may only partially cover said surface. The adhesive can be applied in various forms and ways; for example as a film, as transverse bonding strips or transverse fibres (transverse with respect to the unidirectional fibres), or by coating the layer of unidirectionally aligned fibres, e.g. with a polymer melt or a solution or dispersion of a polymer material in a liquid. Preferably, the adhesive is homogeneously distributed over the entire surface of the layer, whereas a bonding strip or bonding fibres can be applied locally.

A suitable adhesive includes a thermosetting polymer or a thermoplastic polymer, or a mixture of the two. Thermosetting polymers include vinyl esters, unsaturated polyesters, epoxides or phenol resins. Thermoplastic polymers include polyurethanes, polyvinyls, polyacrylics, polyolefins, polybutyleneterephthalate (PBT), or thermoplastic elastomeric block copolymers such as polystyrene-polybutylene-polystyrene or polystyrene-polyisoprene-polystyrene block copolymers. From the group of thermosetting polymers, vinyl esters, unsaturated polyesters, epoxides or phenol resins are preferred.

A preferred thermoplastic polymer comprises a copolymer of ethylene which may contain as co-monomers one or more olefins having 2 to 12 C-atoms, in particular ethylene, propylene, isobutene, 1-butene, 1-hexene, 4-methyl-1-pentene, 1-octene, acrylic acid, methacrylic acid and vinyl acetate. In the absence of co-monomer in the polymeric resin, a wide variety of polyethylene may be present, for example linear low density polyethylene (LLDPE), very low density polyethylene (VLDPE), low density polyethylene (LDPE), or blends thereof. However, high density polyethylene (HDPE) is preferred.

One particularly preferred thermoplastic polymer comprises a copolymer of ethylene and acrylic acid (ethylene acrylic acid copolymer); or a copolymer of ethylene and methacrylic acid (ethylene methacrylic acid copolymer). Preferably, said adhesive is applied as an aqueous suspension.

An alternative particularly preferred thermoplastic polymer is a plastomer wherein said plastomer is a random copolymer of ethylene or propylene and one or more $C_2$ to $C_{12}$ α-olefin co-monomers. More preferably, the thermoplastic polymer is a homopolymer or copolymer of ethylene and/or propylene.

The melting point of the adhesive is below that of the polyolefin fibers. Typically, the adhesive has a melting point below 155° C. Preferably it is from 115° C. to 150° C.

Preferably, the total amount of adhesive present is from 6.0 to 11.0 wt. % based on the total weight of the ballistic-resistant molded article. More preferably, the total amount of adhesive present is from 7.0 to 10.5 wt. %; more preferably from 7.5 to 10.0 wt. %; most preferably from 8.0 to 9.5 wt. % based on the total weight of the ballistic-resistant molded article.

The adhesive typically does not penetrate substantially into the layers of unidirectionally aligned polyolefin fibers. Preferably, the adhesive does not penetrate at all into the layers of unidirectionally aligned polyolefin fibers. Accordingly, the adhesive does not act as a bonding agent between fibers within a single layer of unidirectionally aligned fibers. Preferably, the ballistic-resistant molded article comprises a plurality of layers of unidirectionally aligned polyolefin fibers which layers are substantially absent a bonding matrix; and a plurality of layers of adhesive.

In the ballistic-resistant article of the present invention the adhesive layer may comprise a complete layer, for example a film; a continuous partial layer, for example a web; or a disperse partial layer, for example spots or islands of adhesive.

Preferably, in step b) each layer of unidirectionally aligned polyolefin fibers is oriented at an angle of from 45° to 135° with respect to the orientation of the unidirectionally aligned polyolefin fibers of an adjacent layer of unidirectionally aligned polyolefin fibers. A preferred angle is 75° to 105'; for example about 90°. Preferably, in step b) each layer of unidirectionally aligned polyolefin fibers is separated from an adjacent layer of unidirectionally aligned polyolefin fibers by a layer of adhesive. The precursor sheet of the present invention comprises at least one layer of polyolefin fibers and at least one layer of adhesive. Typically a precursor sheet comprises an equal number of layers of unidirectionally aligned polyolefin fibers substantially absent a bonding matrix and layers of adhesive. Typically, a precursor sheet comprises from 2 to 8 layers of unidirectionally oriented polyolefin fibers, preferably 2 or 4. Typically, a precursor sheet comprises from 2 to 8 layers of adhesive, preferably 2 or 4. Typically, said precursor sheet comprises only layers of unidirectionally oriented polyolefin fibers substantially absent a bonding agent and layers of adhesive. Preferably, each layer of unidirectionally aligned polyolefin fibers is oriented at an angle of from 45° to 135° with respect to the orientation of the unidirectionally aligned polyolefin fibers of an adjacent layer of polyolefin fibers. A preferred angle is 75° to 105°; for example about 90°. Preferably each layer of unidirectionally aligned polyolefin fibers is separated from an adjacent layer of unidirectionally aligned polyolefin fibers by a layer of adhesive.

Typically, the process further comprises, before step a), step a') producing a precursor sheet, which precursor sheet comprises:

i) at least one layer of unidirectionally aligned polyolefin fibers which layer is substantially absent a bonding matrix, and
ii) at least one layer of adhesive;
by applying a layer of adhesive to a layer of unidirectionally aligned polyolefin fibers which layer is substantially absent a bonding matrix.

Preferably, in step a') from 5.0 to 12.0 wt % adhesive is applied to a layer of unidirectionally aligned polyolefin fibers, which layer is substantially absent a bonding matrix, based on the total weight of the layer and the adhesive. Preferably, the total amount of adhesive present is from 6.0 to 11.0 wt. % based on the total weight of the precursor sheet. More preferably, the total amount of adhesive present is from 7.0 to 10.5 wt. %; more preferably from 7.5 to 10.0 wt. %; most preferably from 8.0 to 9.5 wt. % based on the total weight of the precursor sheet.

A precursor sheet having more than one layer of unidirectionally aligned polyolefin fibers and/or more than one layer of adhesive may be produced by producing multiple precursor sheets each comprising i) one layer of unidirectionally aligned polyolefin fibers which layer is substantially absent a bonding matrix, and ii) one layer of adhesive; for example as in step a') followed by stacking a number of said precursor sheets; and consolidating said precursor sheets under elevated temperature and pressure. The temperature and pressure applied can be selected so as to cause adhesion between adjacent sheets. The temperature must be below the melting point of the polyolefin fibers.

Preferably, step a') further comprises consolidating two layers of unidirectionally aligned polyolefin fibers which layers are substantially absent a bonding matrix, and a layer of adhesive, wherein the layers of unidirectionally aligned polyolefin fibers are separated by the layer of adhesive. More preferably, in step a') the two layers of unidirectionally aligned fiber are oriented at from 45° to 135° from each other. A preferred angle is 75° to 105°; for example about 90°.

Typically, a precursor sheet comprising one layer of polyolefin fibers and one layer of adhesive has an areal density of from 25 to 150 $gm^{-2}$; preferably from 35 to 100 $gm^{-2}$; more preferably from 45 to 75 $gm^{-2}$. Typically, a precursor sheet comprising two layers of polyolefin fibers and two layers of adhesive has an areal density of from 50 to 300 $gm^{-2}$; preferably, from 70 to 200 $gm^{-2}$; more preferably from 90 to 150 $gm^{-2}$.

Typically, a molded article of the present invention comprises from 20 to 480 layers of unidirectionally oriented polyolefin fibers. Preferably, it comprises from 60 to 360 layers; more preferably from 100 to 240 layers. The number of layers required depends on the application and the ballistic threat to be defended against.

The areal density of the ballistic-resistant molded article will depend on the number of layers and areal density of the layers selected. Areal density of the ballistic-resistant molded article is typically from 1 to 100 $Kgm^{-2}$. Preferably, a molded article of the present invention has an areal density of from 5 to 50 $Kgm^{-2}$. More preferably, it has an areal density of from 7 to 20; most preferably from 8 to 15 $Kgm^{-2}$.

A ballistic-resistant molded article according to the present invention may be flat. Such a molded article is produced by pressing between flat plates. However, the ballistic-resistant molded article may alternatively be a curved molded article. It may be curved in one direction or in two directions. Such curvature may be achieved by pressing in a curved mold in a conventional press; whereby the mold defines the shape of the molded article to be produced. A dome is an example of a shape curved in two directions.

A ballistic-resistant molded article of the present invention or produced by the process of the present invention is a form of hard ballistic material. It is suitable for use in an insert in ballistic-resistant clothing or as the shell of a helmet for personal protection; or in armor for vehicle protection. It may also be suitable as a part for a ballistic resistant helmet, for example an appliqué or a mandible. Typically, inserts in ballistic clothing are curved in one or two directions. For example, a chest plate insert may be curved slightly in two directions. Vehicle armor may be curved in one or two directions or may be flat. A helmet shell is curved to a large degree in two directions.

The specific energy of absorption ($E_{abs}$ or SEA) of a molded article according to the present invention has been found to increase as pressure applied during the pressing step is increased. One mechanism proposed in WO1997/00766 for an increase in ballistic performance is the removal of voids in the material due to expulsion of trapped gases; leading to an increased density of the material. However, in the present invention, surprisingly, the thickness of the material was found to be reduced by an amount much lower than material of the prior art. The mechanism of reduction of voids by expelling gases does not explain the effect of low reduction of thickness observed in the ballistic-resistant article of the present invention.

An advantage of this increased dimensional stability of the ballistic-resistant molded article of the present invention effect is that, regardless of the pressure applied during molding, the thickness is substantially the same. In other words, change in gap between mold parts for pressing the material is surprisingly low. The increased dimensional stability enables more accurate design of molded articles. The molded articles can be produced to a high degree of tolerance for product specifications, even when produced on a variety of different pressing equipment under differing conditions.

The increased dimensional stability has a particular advantage in pressing highly curved molded articles, for example highly curved shaped vehicle armor, or helmets. In such applications, pressing in a traditional press applies pressure only in one axis; which means the applied pressure transverse to this axis is only a component of this force. For example, pressing a helmet shell in a traditional press will apply higher pressure to the crown than to the circumference of the helmet shell. The ability to accurately predict the necessary mold gap at the circumference of the helmet mold ensures adequate pressure is applied in transversal directions, leading to higher performance at the circumference.

It is known in the art to use a two-stage pressing process to mitigate the effects of such a problem. In a first stage, layers of material are consolidated at relatively low pressure in a first mold to form a partially pressed object having the approximate shape of the finished article. In a second stage, the partially pressed article is pressed at high pressure in a second mold to produce the finished article. A first pressure might be 2 MPa; and a second pressure might be 16.5 MPa. Because of the high dimensional stability of the material of the present invention, i.e. it has a low consolidation parameter, $^{140}T_{16.5\text{-}2}$, (expressed as a %) a first partial pressing step is not required. Accordingly, the process of producing highly curved molded articles may be simplified from a two-step pressing process to a one-step pressing process. The present invention accordingly preferably provides, a ballistic-resistant molded article, wherein the ballistic-resistant molded article has a consolidation parameter ($140T_{16.5\text{-}2}$) of less than 7%; wherein $140T_{16.5-2}$ is the % reduction in thickness of the plurality of layers of unidirectionally aligned polyolefin fibers which layers are substantially absent a bonding matrix and plurality of layers of adhesive when subjected to a pressure of 16.5 MPa at 140° C. based on the thickness when subjected to a pressure of 2 MPa at 140° C.

Preferably, the ballistic-resistant molded article has a consolidation ($140T_{16.5-2}$) parameter of less than 5%. More preferably $^{140}T_{16.5-2}$ is less than 4%; less than 3% or even less than 2%.

The molded article of the present invention may comprise a film at one or both faces. Such a film has the property of protecting the surface from scratching or abrasion. Suitable films include thin films, for example of less than 20, less than 15 or even less than 10 µm thick, made from thermoplastic polymers, for example polyolefins, e.g. polyethylene, polypropylene or their copolymers; polytetrafluoroethylene; polyesters, polyamides, or polyurethanes, including thermoplastic elastomeric versions of said polymers. However, typically, said ballistic-resistant molded article comprises only layers of unidirectionally oriented polyolefin fibers substantially absent a bonding agent and layers of adhesive.

The ballistic-resistant molded article of the present invention may have improved specific energy of absorption ($E_{abs}$ or SEA), back-face deformation, or delamination, or a combination thereof. In particular, specific energy of absorption ($E_{abs}$ or SEA) against rifle threats, for example 7.62×39 mm MSC (AK47) or SS109, of a molded article has been found to be particularly good.

Preferably, a ballistic-resistant molded article of the present invention has an areal density of at most 11 $Kgm^{-2}$ and said molded article meets NIJ level III$^+$ performance against 7.62×39 mm MSC (AK47). More preferably, a ballistic-resistant molded article of the present invention has an areal density of at most 10 $Kgm^{-2}$; or even at most 9 $Kgm^{-2}$ and said molded article meets NIJ level III$^+$ performance against 7.62×39 mm MSC (AK47).

A ballistic-resistant molded article according to the present invention typically has an $E_{abs}$ of at least 205 $JKg^{-1} m^2$ against 7.62×39 mm MSC (AK47). However, a ballistic-resistant molded article may be produced with an $E_{abs}$ of at least 240, more preferably at least 280, at least 300 or even at least 330 $JKg^{-1} m^2$ against 7.62×39 mm MSC (AK47). $E_{abs}$ is typically determined at 9.8 $Kgm^{-2}$.

Back face signature (BFS) of a ballistic-resistant molded article according to the present invention is typically less than 5 mm, measured against 9 mm FMJ RN (Remmington), spaced, based on an areal density of 6.8 $Kgm^{-2}$. Preferably it is less than 4 mm, more preferably less than 3 mm, or even less than 2 mm.

A ballistic-resistant molded article as described herein may be combined with one or more further layers of ballistic-resistant material. Such further ballistic-resistant material includes a polymer ballistic-resistant material or an inorganic ballistic-resistant material. A polymer ballistic-resistant material typically comprises high strength fibers, for example para-aramid or ultrahigh molecular weight polyethylene fibers. Typically, if a polymer ballistic-resistant material is present it is placed away from the strike face of the ballistic-resistant molded article.

A further layer of ballistic-resistant material may alternatively be a sheet of inorganic material selected from the group consisting of ceramic; metal; metal alloys; glass; graphite, or combinations thereof. Particularly preferred is metal, for example aluminum, magnesium, titanium, copper, nickel, chromium, beryllium, iron and copper including their alloys. The thickness of the inorganic sheet can vary within wide ranges and is preferably between 1 mm and 50 mm, more preferably between 2 mm and 30 mm. Typically, if an inorganic ballistic-resistant material is present it is positioned at the strike face of the ballistic-resistant molded article.

The further ballistic-resistant material may be adhered to the ballistic-resistant molded article or may be separate. Adhesion may be achieved by pressing, with or without the presence of a further adhesive. Such adhesive may comprise an epoxy resin, a polyester resin, a polyurethane resin or a vinylester resin. In another preferred embodiment, the bonding layer may further comprise a woven or non-woven layer of inorganic fiber, for instance glass fiber or carbon fiber.

Test methods as referred to in the present application, are as follows:

IV: the Intrinsic Viscosity is determined according to method ASTM D1601 at 135° C. in decalin, the dissolution time being 16 hours, with DBPC as antioxidant in an amount of 2 g/l solution, by extrapolating the viscosity as measured at different concentrations to zero concentration;

Tensile properties (measured at 25° C.): tensile strength (or strength) and tensile modulus (or modulus) are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 metres of fiber; values in GPa are calculated assuming a density of 0.97 $g/cm^3$. Tensile properties of thin films were measured in accordance with ISO 1184(H).

Ballistic performance of molded articles is determined by calculating the $V_{50}$ value on 400 mm×400 mm sample by shooting six shots in a spread pattern at each sample, panel was clamped in frame with no backing material but air. The $V_{50}$ was calculated from 4 samples. Ammunition used is 7.62×39 mm MSC (AK47).

$V_{50}$ is measured by taking the mean value of the lowest two penetration and the highest two non-penetration velocities, as defined at Lightweight Ballistic Composites, Military and Law Enforcement Applications, Bhatnagar, 2006, Woodhead Publishing Limited. Page 29.

Back face signature (BFS) is determined by spacing a 400 mm by 400 mm, 6.8 $Kgm^{-2}$ sample approximately 20 mm from a backing of roma clay using four Team Wendy Zorbium pads, one in each corner. The molded articles are shot four times in an evenly spaced pattern between pads and at least 5 cm from the edge of the molded article. Four molded articles are tested. The indent in the clay of each shot is measured with a caliper; and BFS calculated as an average of the 16 shots. Ammunition used is 9 mm FMJ-RN (Remmington).

EXAMPLES

Example 1

A precursor sheet was produced from 40 yarns of Dyneema® SK76 1760 dtex yarn, available from DSM Dyneema, Heerlen, Netherlands. Yarn was unwound from bobbins on a tension controlled creel and passed through a reed. Subsequently the yarns were spread to form a gap-less bed of filaments with a width of 320 mm by feeding the yarns over a spreading unit. The spread yarns were then fed into a calender. The rolls of the calender had a diameter of 400 mm and the applied line pressure was 2000N/cm. The line operated at a line speed of 8 m/min and at a roll surface temperature of 154° C. In the calender the yarns were fused into a fibrous tape. The tape was removed from the calender by the first roller-stand. A powder scattering unit was placed between the calender and the first roller-stand applying 7 wt. % Queo 1007 powder, available form *Borealis*, Vienna, Austria to the upper surface of the tape. The tape with powder was calendered at elevated temperature and wound onto a roller stand.

A fibrous tape with a width of 320 mm and a thickness of 46 μm was obtained. The fibrous tape had a tenacity of 35.4 cN/dTex and a modulus of 1387 cN/dTex.

Five of said tapes were aligned in parallel and abutting to form 1600 mm wide sheet. A second, identical, sheet of five tapes was formed on top of the first sheet, with the adhesive layers of both sheets facing upwards, but with the fibers aligned perpendicularly. A two-layered, cross-plied sheet having an areal density of 95 gm$^{-2}$ resulted. This sheet was cut into 400 mm×400 mm square precursor sheets. Multiple square precursor sheets were stacked, making sure the alternating 0°/90° direction of the tape layers was maintained. The stack of precursor sheets was processed into a molded article of 9.8 Kgm$^{-2}$. The molded article contained 206 layers of unidirectional aligned tapes. The stack of sheets was pressed into a molded article at 2 MPa and 145° C. for 40 minutes followed by a cooling period of 20 min at 2 MPa.

The molded article was shot with a 7.62×39 mm MSC (AK47) bullet in order to determine $V_{50}$. Results are listed in Table 1, below.

Example 2

A molded article was produced according to Example 1, except that a pressure of 8 MPa was applied.

Example 3

A molded article was produced according to Example 1, except that a pressure of 16 MPa was applied.

Comparative Experiment A 400 mm×400 mm sheets of unidirectionally aligned fiber layers, available as HB210 from DSM Dyneema, Heerlen, Netherlands, were stacked to form an assembly having an areal density of 13.0 Kgm$^{-2}$. The sheets each comprised 4 layers, each layer comprising unidirectionally aligned fibers of UHMWPE embedded in a matrix of 17% of a polyurethane resin, and layered in the configuration of fiber direction 0°/90°/0°/90°. In total, 96 sheets were used, with the alternating 0°/90° direction of adjacent layers maintained throughout the stack. The assembly of sheets was pressed at 2 MPa and 125° C. for 40 minutes followed by a cooling period of 20 min at 2 MPa. A molded article having an areal density of 13.0 Kgm$^{-2}$ resulted. The molded article was shot with a 7.62×39 mm MSC (AK47) bullet in order to determine $V_{50}$. Results are listed in Table 1, below.

Comparative Experiment B

A molded article was produced according to Comparative Experiment A, except that a pressure of 8 MPa was applied.

Comparative Experiment C

A molded article was produced according to Comparative Experiment C, except that a pressure of 16.5 MPa was applied.

TABLE 1

| Example no. | Areal density [Kgm$^{-2}$] | Pressure [MPa] | Thickness [mm] | $^{140}T_{16.5-2}$ [%] | $V_{50}$ [ms$^{-1}$] | $E_{abs}$ [JKg$^{-1}$m$^2$] |
|---|---|---|---|---|---|---|
| C. Ex. A | 13.0 | 2 | 14.3 | 9 | 653 | 131 |
| C. Ex. B | 13.0 | 8 | 13.4 | 9 | 724 | 161 |
| C. Ex. C | 13.0 | 16.5 | 13.0 | 9 | 810 | 201 |
| Ex. 1 | 9.8 | 2 | 10.4 | 3 | 627 | 160 |
| Ex. 2 | 9.8 | 8 | 10.2 | 3 | 710 | 205 |
| Ex. 3 | 9.8 | 16.5 | 10.1 | 3 | 793 | 256 |

These results show that, for a ballistic-resistant molded article consisting of a material according to the present invention, an $E_{abs}$ of over 200 may be achieved by applying a pressure of only 8 MPa; whereas for a molded article according to the prior art, a pressure of 16.5 MPa is required to achieve an $E_{abs}$ of over 200. Further, increasing the pressure applied to achieve this performance from a pressure of 2 MPa to 16.5 MPa, leads to a reduction in thickness of from only 10.4 to 10.1 mm in the material of the present invention; whereas a reduction in thickness of from 14.3 to 13.0 is observed in the Comparative Examples.

Comparative Experiment D

Example 1 was repeated but using 4 wt. % Queo 1007 powder and instead stacking only enough precursor sheets to produce a 400 mm by 400 mm molded article having an areal density of 6.8 Kgm$^{-2}$. Molded articles were shot with 9 mm (Remington) ammunition to determine Back Face Signature (BFS). Results are given in Table 2, below.

Example 4

Comparative Experiment D was repeated but using 7 wt. % Queo 1007 powder.

Example 5

Comparative Experiment D was repeated but using 10 wt. % Queo 1007 powder.

TABLE 2

| Example no. | wt. % adhesive | BFS [mm] |
|---|---|---|
| C. Ex. D | 4 | 6.3 |
| Ex. 4 | 7 | 3.4 |
| Ex. 5 | 10 | 3.4 |

These results show that surprisingly back face deformation is reduced in Examples 4 and 5 according to the present invention, compared with a molded article having a higher wt. % of adhesive (Comparative Experiment D), which adhesive is impregnated into the fiber layers. Further, the difference between Example 4 and Example 5, did not indicate any improvement in BFS resulting from the addition of 10% matrix rather than 7% matrix.

The invention claimed is:

1. A process for producing a ballistic-resistant molded article, wherein the molded article comprises:
    i) a plurality of layers of unidirectionally aligned fused polyolefin fibers, which layers are substantially absent a bonding matrix; and
    ii) a plurality of layers of adhesive between adjacent layers of the unidirectionally aligned fused fibers, and wherein the process comprises:
a) providing a plurality of precursor sheets, each of said precursor sheets comprising:
   i) at least one layer of unidirectionally aligned fused polyolefin fibers, wherein the at least one layer is substantially absent of a bonding matrix, and
   ii) at least one layer of adhesive;
b) stacking the precursor sheets to form a stack, wherein the total amount of the adhesive in the stack is from 5.0 to 12.0 wt. % based on the total weight of the stack;
c) pressing the stack produced in step b) at a temperature of from 1 to 30° C. below the melting point of the polyolefin fibers and at a pressure of at least 8 MPa; and
d) cooling the pressed stack produced in step c) to at least 50° C. below the melting point of the polyolefin fibers while maintaining pressure.

2. The process according to claim 1, wherein the pressure of step c) is at least 10 MPa.

3. The process according to claim 1, wherein the total amount of the adhesive present is from 6.0 to 11.0 wt. % based on the total weight of the stack.

4. The process according to claim 1, wherein step b) comprises orienting each layer of the unidirectionally aligned fused polyolefin fibers which layer in which a bonding matrix is substantially absent at an angle of from 45° to 135° with respect to an orientation of the unidirectionally aligned fused polyolefin fibers of an adjacent layer of polyolefin fibers in which a bonding matrix is substantially absent.

5. The process according to claim 1, wherein step b) comprises separating each layer of the unidirectionally aligned fused polyolefin fibers in which a bonding matrix is substantially absent from an adjacent layer of the unidirectionally aligned fused polyolefin fibers in which a bonding matrix is absent by a layer of adhesive.

6. The process according to claim 1, further comprising, before step a), step a') producing a precursor sheet which comprises:
   i) at least one layer of unidirectionally aligned fused polyolefin fibers in which a bonding matrix is substantially absent, and
   ii) at least one layer of adhesive;
   by applying a layer of adhesive to a layer of unidirectionally aligned fused polyolefin fibers in which a bonding matrix is substantially absent.

7. The process according to claim 6, wherein step a') comprising applying from 5.0 to 12.0 wt % adhesive to the layer of the unidirectionally aligned fused polyolefin fibers in which a bonding matrix is substantially absent a bonding matrix, based on the total weight of the layer and the adhesive.

8. The process according to claim 7, wherein step a') further comprises consolidating two layers of the unidirectionally aligned fused polyolefin fibers in which a bonding matrix is substantially absent, and a layer of adhesive, wherein the layers of unidirectionally aligned fused polyolefin fibers are separated by the layer of adhesive.

9. The process according to claim 8, wherein step a') comprises orienting the two layers of the unidirectionally aligned fused polyolefin fiber in which a bonding matrix is substantially absent at from 45° to 135° relative to each other.

* * * * *